US011255379B2

(12) United States Patent
Baskin et al.

(10) Patent No.: US 11,255,379 B2
(45) Date of Patent: Feb. 22, 2022

(54) UNIBALL BEARING WITH COMPLIANT INNER MEMBER

(71) Applicant: Sikorsky Aircraft Corporation, Stratford, CT (US)

(72) Inventors: Bryan Kenneth Baskin, Arlington, TX (US); James Orbon, New Haven, CT (US); Stephen V. Poulin, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 146 days.

(21) Appl. No.: 16/328,671

(22) PCT Filed: Jul. 19, 2017

(86) PCT No.: PCT/US2017/042738
§ 371 (c)(1),
(2) Date: Feb. 26, 2019

(87) PCT Pub. No.: WO2018/057092
PCT Pub. Date: Mar. 29, 2018

(65) Prior Publication Data
US 2019/0203765 A1    Jul. 4, 2019

Related U.S. Application Data

(60) Provisional application No. 62/398,166, filed on Sep. 22, 2016.

(51) Int. Cl.
*F16C 25/04* (2006.01)
*F16C 23/04* (2006.01)
(Continued)

(52) U.S. Cl.
CPC .............. *F16C 25/04* (2013.01); *B64C 27/32* (2013.01); *B64C 27/605* (2013.01);
(Continued)

(58) Field of Classification Search
CPC ...... F16C 25/04; F16C 23/043; F16C 23/046; F16C 23/045; F16C 27/02; F16C 27/063; B64C 27/32; B64C 27/605
See application file for complete search history.

(56) References Cited

U.S. PATENT DOCUMENTS

| 1,768,290 A | 6/1930 | Newkirk |
| 3,969,803 A | 7/1976 | McCloskey |

(Continued)

OTHER PUBLICATIONS

Extended European Search Report; International Application No. 17853585.2-1009; International Filing Date: Apr. 18, 2019; dated May 27, 2020; 7 pages.

(Continued)

*Primary Examiner* — Courtney D Heinle
*Assistant Examiner* — Danielle M. Christensen
(74) *Attorney, Agent, or Firm* — Foley & Lardner LLP

(57) ABSTRACT

A spherical bearing which extends from and connects to a deformable component includes an outer member and an inner member. The inner member is pivotable relative to the outer member about an axis. The inner member has an opening formed therein that defines a plurality of coplanar contact surfaces shaped to accommodate and contact the component. The plurality of contact surfaces are movable to accommodate deformation of the component positioned within the opening.

18 Claims, 6 Drawing Sheets

(51) Int. Cl.
  *B64C 27/32* (2006.01)
  *B64C 27/605* (2006.01)
  *F16C 27/02* (2006.01)
  *B64C 27/12* (2006.01)

(52) U.S. Cl.
  CPC .......... *F16C 23/043* (2013.01); *F16C 23/046* (2013.01); *F16C 27/02* (2013.01); *B64C 27/12* (2013.01); *F16C 2326/43* (2013.01)

(56) References Cited

U.S. PATENT DOCUMENTS

| | | | |
|---|---|---|---|
| 4,080,014 A * | 3/1978 | Riegler | C21C 5/464 384/297 |
| 4,268,094 A | 5/1981 | Greene | |
| 4,395,142 A | 7/1983 | Lobeck | |
| 4,729,753 A | 3/1988 | Neathery et al. | |
| 5,083,725 A * | 1/1992 | Byrnes | B64C 27/605 244/17.25 |
| 5,281,099 A | 1/1994 | Hunter et al. | |
| 5,915,842 A | 6/1999 | Redinger | |
| 6,325,326 B1 * | 12/2001 | Pancotti | B64C 27/605 244/17.25 |
| 7,585,153 B1 | 9/2009 | Schmaling et al. | |
| 8,303,248 B2 | 11/2012 | Cabrera et al. | |
| 8,568,100 B2 | 10/2013 | Muylaert et al. | |
| 9,085,357 B2 | 7/2015 | Davis et al. | |
| 2008/0056631 A1 | 3/2008 | Beausoleil et al. | |
| 2013/0341458 A1 | 12/2013 | Sutton et al. | |
| 2016/0238069 A1 | 8/2016 | Bohm | |

OTHER PUBLICATIONS

International Search Report issued in Application No. PCT/US2017/042738; International Filing Date: Jul. 19, 2017; dated Dec. 26, 2017; 7 pages.

Written Opinion of the International Search Authority issued in Application No. PCT/US2017/042738; Date of Filing: Jul. 19, 2017; dated Dec. 26, 2017; 6 pages.

* cited by examiner

UNIBALL BEARING WITH COMPLIANT INNER MEMBER

CROSS REFERENCE TO RELATED APPLICATIONS

This application is a National Stage application of PCT/US2017/042738, filed Jul. 19, 2017, which claims the benefit of U.S. Provisional Application No. 62/398,166, filed Sep. 22, 2016, both of which are incorporated by reference in their entirety herein.

STATEMENT REGARDING FEDERALLY SPONSORED RESEARCH OR DEVELOPMENT

This invention was made with Government support under Agreement No. W911W6-13-2-0003 for the Joint Multi-Role Technology Demonstrator Phase I-Air Vehicle Development program. The Government has certain rights in the invention.

BACKGROUND OF THE INVENTION

Exemplary embodiments of the invention relate to a rotary wing aircraft, and more particularly, to a swashplate for controlling a rotor assembly of a rotary wing aircraft.

Control of a rotary wing aircraft is affected by varying the pitch of the rotor blades individually as the rotor rotates and by varying the pitch of all of the blades together. These are known respectively as cyclic and collective pitch control. Blade pitch control of a rotary wing aircraft is typically achieved through a swashplate assembly which transfers the motion of non-rotating servo-driven control members within to the rotating members.

The swashplate assembly is typically concentrically mounted about a rotor shaft. The swashplate assembly includes two rings connected by a series of bearings with one ring connected to the airframe (stationary), and the other ring connected to the rotor hub (rotating). The rotating ring is connected to the rotor hub through a pivoted link device typically referred to as "scissors", with the static ring similarly connected to the airframe. The rotating swash plate rotates relative the stationary swash plate. Apart from rotary motion, the stationary and rotating swash plate otherwise move as a unitary component. Collective control is achieved by translating the swash plate assembly up and down with respect to the rotor shaft and cyclic control is achieved by tilting the swash plate relative to the rotor shaft.

The stationary ring is typically mounted about the rotor shaft through a spherical ball joint that allows for tilt of the swash plate assembly, with the rotor shaft allowing translation of the swash plate assembly along the axis. The spherical ball joint requires a running surface to allow for translation along the axis. However, the surface is subject to thermal growth and elastic deformation that may negatively impact operation of the bearing.

BRIEF DESCRIPTION OF THE INVENTION

According to one embodiment of the invention, a spherical bearing which extends from and connects to a deformable component includes an outer member and an inner member. The inner member is pivotable relative to the outer member about an axis. The inner member has an opening formed therein that defines a plurality of coplanar contact surfaces shaped to accommodate and contact the component. The plurality of contact surfaces are movable to accommodate the deformation of the component positioned within the opening.

In addition to one or more of the features described above, or as an alternative, in further embodiments the inner member comprises an elastomeric material.

In addition to one or more of the features described above, or as an alternative, in further embodiments the outer member has a generally concave surface and the inner member has a generally convex surface.

In addition to one or more of the features described above, or as an alternative, in further embodiments a wear liner is disposed on an inner surface of the outer member between the outer member and the inner member.

In addition to one or more of the features described above, or as an alternative, in further embodiments the inner member includes at least one recessed area arranged between adjacent contact surfaces.

In addition to one or more of the features described above, or as an alternative, in further embodiments comprising a liner bonded to at least one of the plurality of contact surfaces of the inner member.

In addition to one or more of the features described above, or as an alternative, in further embodiments the liner comprises a resilient material.

In addition to one or more of the features described above, or as an alternative, in further embodiments the liner comprises a Teflon wear surface.

In addition to one or more of the features described above, or as an alternative, in further embodiments comprising a compressible member positioned within the recessed area between the inner member and the liner.

In addition to one or more of the features described above, or as an alternative, in further embodiments the compressible member biases the liner into contact with a wear surface of the component towards the opening.

According to another embodiment, a rotor system is provided including a rotationally stationary swashplate pivotally mounted about a central pivot point defined along an axis of rotation via a spherical bearing and a rotational swashplate which defines a rotor pitch control point. The rotor pitch control point is defined along an in-line plane which passes through said central pivot point. A bearing system is mounted between said rotationally stationary swashplate and said rotational swashplate. The bearing system includes a spherical bearing for receiving a deformable component. The spherical bearing includes a complementary outer member and an inner member. The inner member is pivotable relative to the outer member about an axis. The inner member has an opening formed therein that defines a plurality of coplanar contact surfaces shaped to accommodate and contact the component. The contact surfaces are movable to accommodate the deformation of the component.

In addition to one or more of the features described above, or as an alternative, in further embodiments the outer member has a generally concave surface and the inner member has a generally convex surface.

In addition to one or more of the features described above, or as an alternative, in further embodiments the inner member comprises an elastomeric material.

In addition to one or more of the features described above, or as an alternative, in further embodiments a wear liner is disposed on an inner surface of the outer member between the outer member and the inner member.

In addition to one or more of the features described above, or as an alternative, in further embodiments comprising a liner bonded to at least one of the plurality of contact surfaces of the inner member.

In addition to one or more of the features described above, or as an alternative, in further embodiments the liner comprises a resilient material.

In addition to one or more of the features described above, or as an alternative, in further embodiments comprising a compressible member positioned within the recessed area between the inner member and the liner.

In addition to one or more of the features described above, or as an alternative, in further embodiments the compressible member biases the liner into contact with a wear surface of the component towards the opening.

In addition to one or more of the features described above, or as an alternative, in further embodiments the rotor system is a portion of an aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
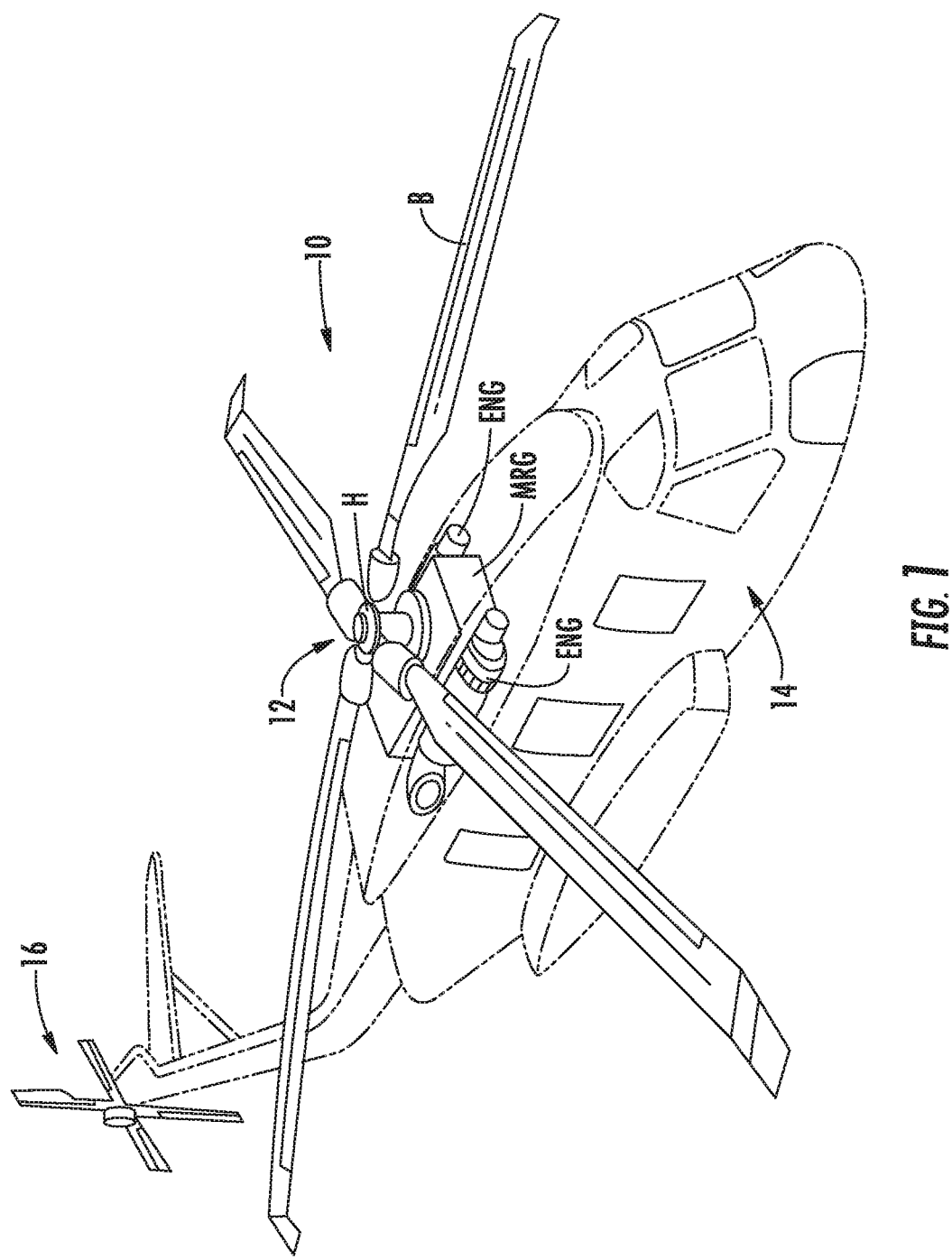
FIG. 1 is a perspective view of an example of a rotary wing aircraft.

FIG. 1 schematically illustrates an exemplary vertical takeoff and landing (VTOL) rotary-wing aircraft 10. The aircraft 10 in the disclosed, non-limiting embodiment includes a main rotor system 12 supported by an airframe 14 having an extending tail which mounts an anti-torque system 16 such as a tail rotor system. The main rotor system 12 includes a multiple of rotor blades B mounted to a rotor hub H. The main rotor system 12 is driven about an axis of rotation A through a main rotor gearbox MRG by one or more engines ENG. The main gearbox MRG may be interposed between the one or more engines ENG, the main rotor system 12 and the anti-torque system 16 such that the main rotor system 12 and the anti-torque system 16 are both driven by the main gearbox MRG. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
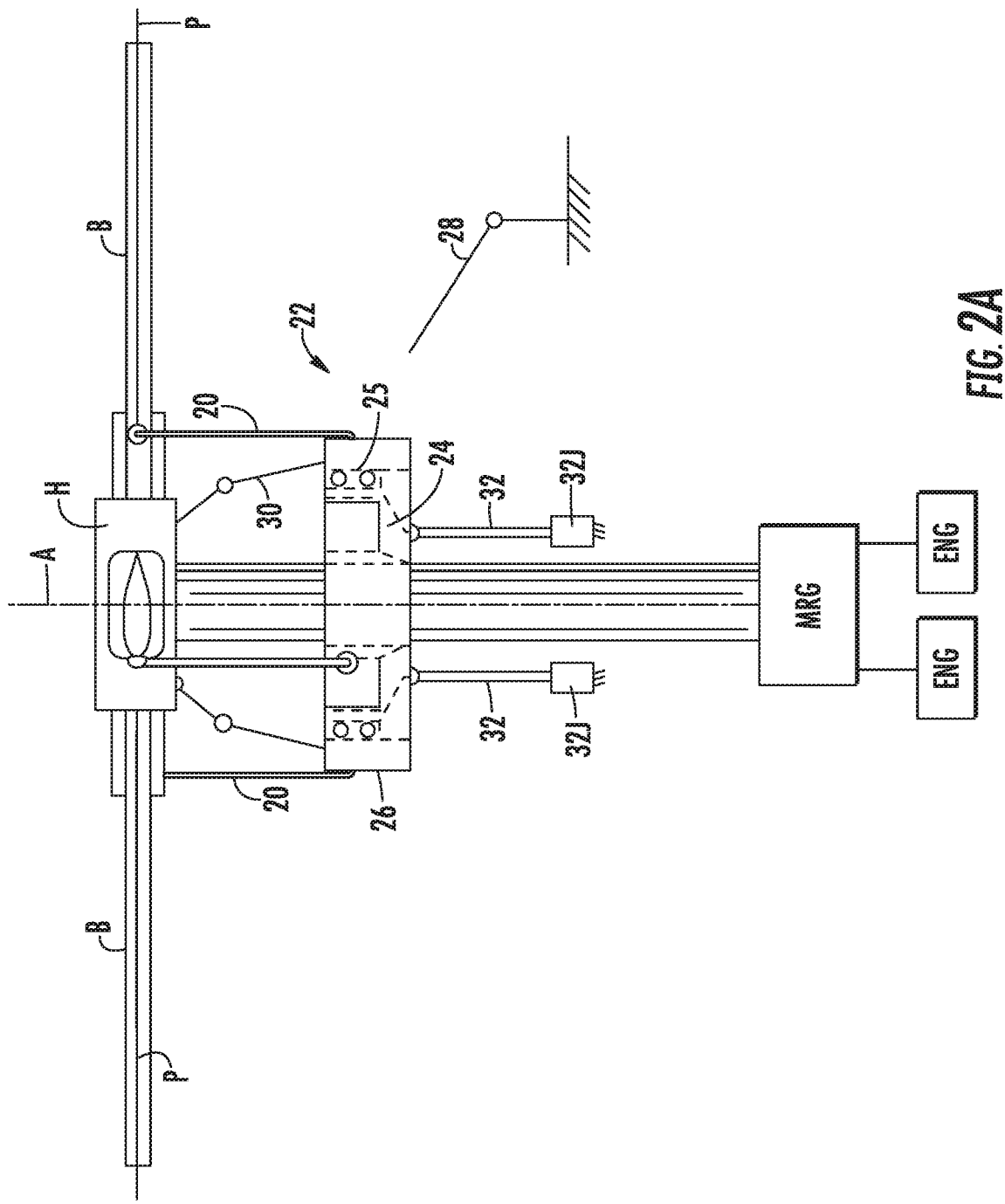
FIG. 2A is a schematic diagram of a rotor system for use with a swashplate assembly.

Referring to FIG. 2A, each rotor blade B is mounted to the rotor hub H so as to be flexible about a pitch change axis P. It should be understood that various attachment systems and rotor blade pitch change systems may alternatively or additionally be utilized. Pitch change loads are imparted to each rotor blade B by pitch control rods 20. One end section of each pitch control rod 20 is articulatably connected to the rotor blade B and an opposite end section of the pitch control rod 20 is articulately connected to a swashplate assembly 22. The swashplate assembly 22 converts control movements in the non-rotating reference frame into the rotating reference frame.

Figure 2B:
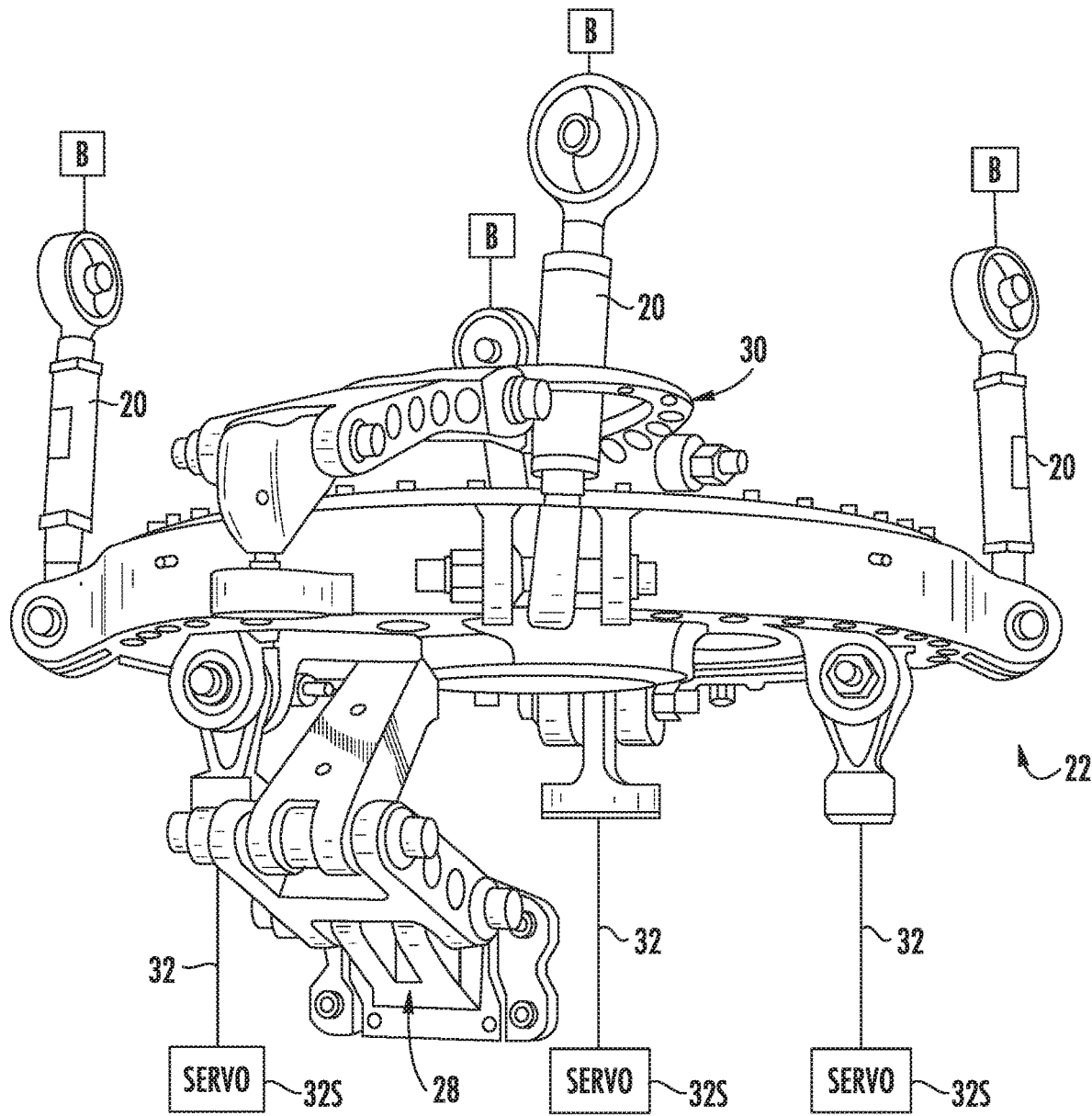
FIG. 2B is a side perspective view of the swashplate assembly of FIG. 2A.

The swashplate assembly 22 includes a rotationally stationary swashplate 24 and rotational swashplate 26 which rotates relative to the rotationally stationary swashplate 24 through a bearing system 25. A stationary scissors assembly 28 is mounted between the rotationally stationary swashplate 24 and the airframe 14. A rotational scissors assembly 30 is mounted to the rotational swashplate 26 and the rotor hub H for rotation therewith (also illustrated in FIG. 2B). The swashplate 22 receives control inputs through a set of servo control rods 32 which are each driven by a respective main rotor servo 32S. Three main rotor servos 32S are typical to allow the swashplate assembly 22 to move with three degrees of freedom; however, any other number of main rotor servos may alternatively be utilized.

Figure 2C:
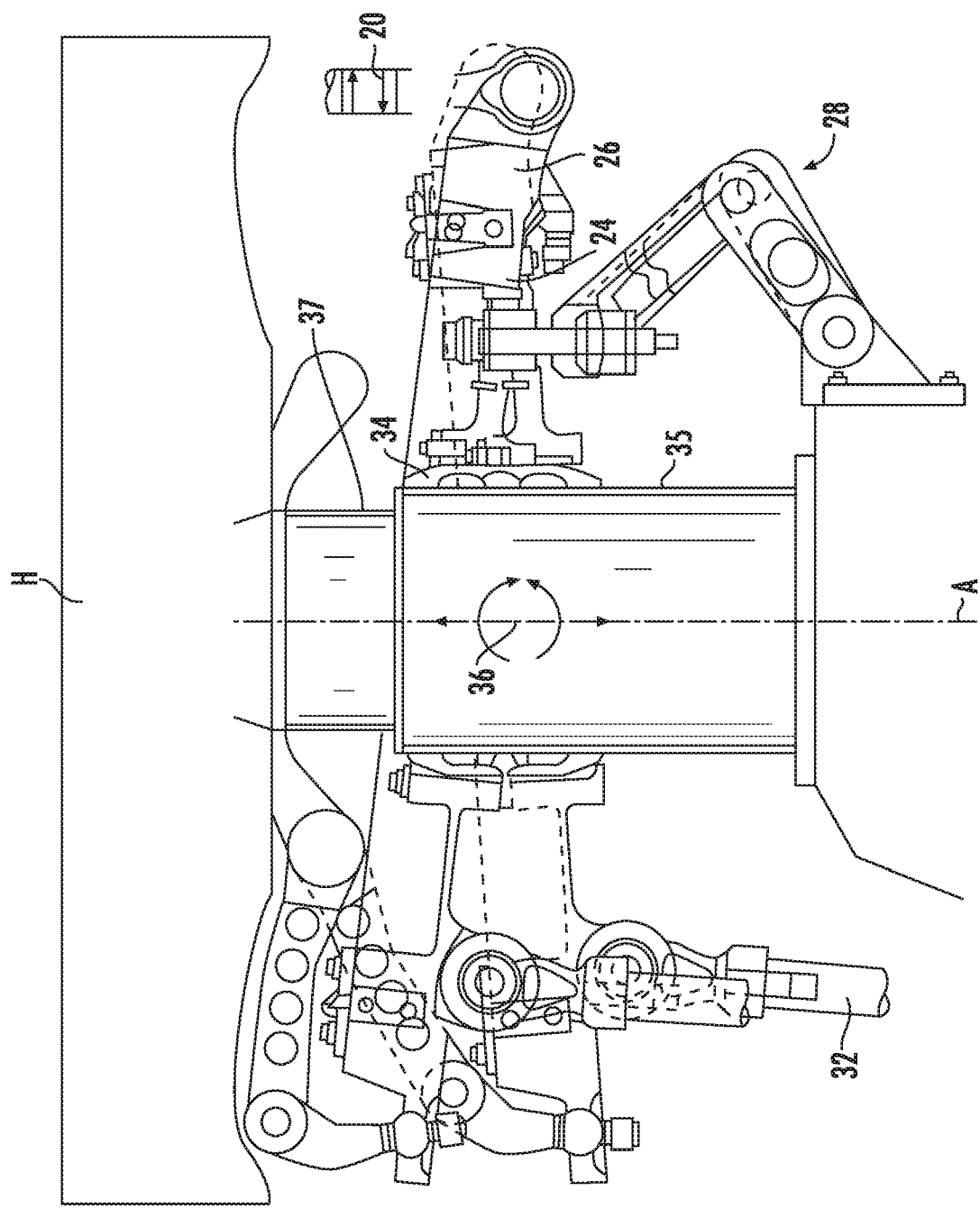
FIG. 2C schematic sectional view of the rotor system of FIG. 2A taken along the axis of rotation.

Pitch control commands imparted through the servo control rods 32 cause tilting of the swashplate assembly 22 about a uniball 34 (FIG. 2C) which defines a central pivot point 36 located along the axis of rotation A. The rotationally stationary swashplate 24 is mounted to a cylindrical swashplate guide 35 through the uniball 34 that permits tilting of the swashplate 22 about a virtual pivot point 36 and translation thereof along the axis of rotation A (FIG. 2C). The cylindrical swashplate guide, also referred to herein as "cylindrical guide" is mounted concentrically about, but not in contact with, the rotor shaft 37. Tilting of the swashplate assembly 22 about the central pivot point 36 imparts pitch change loads to each rotor blade B through the pitch control rods 20 which are mounted to the rotational swashplate 26. Articulation of the swashplate assembly 22 drives the pitch control rods 20 which cause the rotor blade B to pitch about the pitch change axis P. Inputs from the servo control rods 32 cause the swashplate assembly 22 to axially translate along axis of rotation A to impart pitch control loads to the blades B. When the swash plate assembly 22 translates along axis A, it imparts a collective pitch change to the blade assemblies and when it tilts about virtual pivot point 36, it imparts cyclic pitch change.

Figure 3:
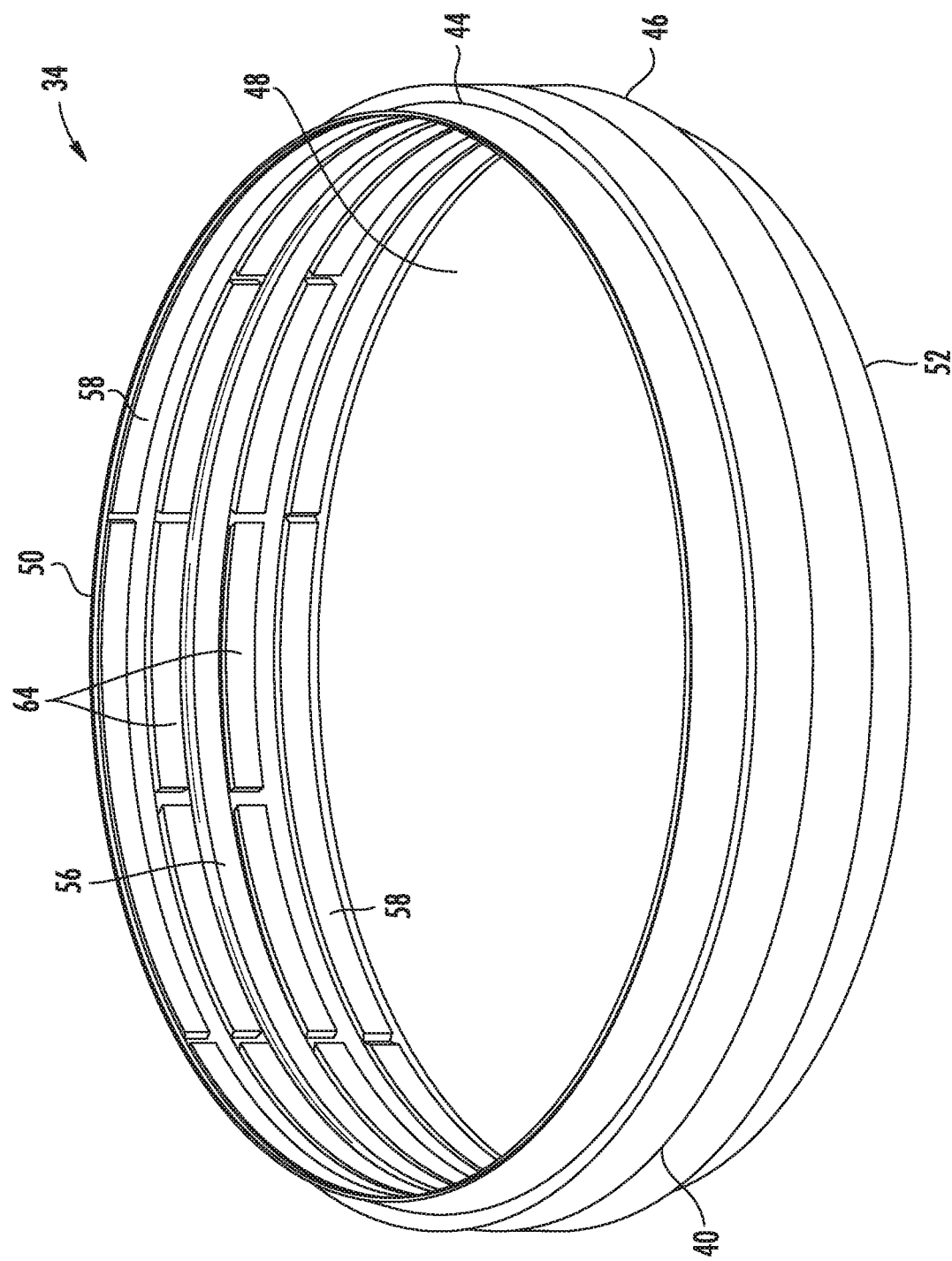
FIG. 3 is a perspective view of a spherical bearing according to an embodiment.
Figure 4:
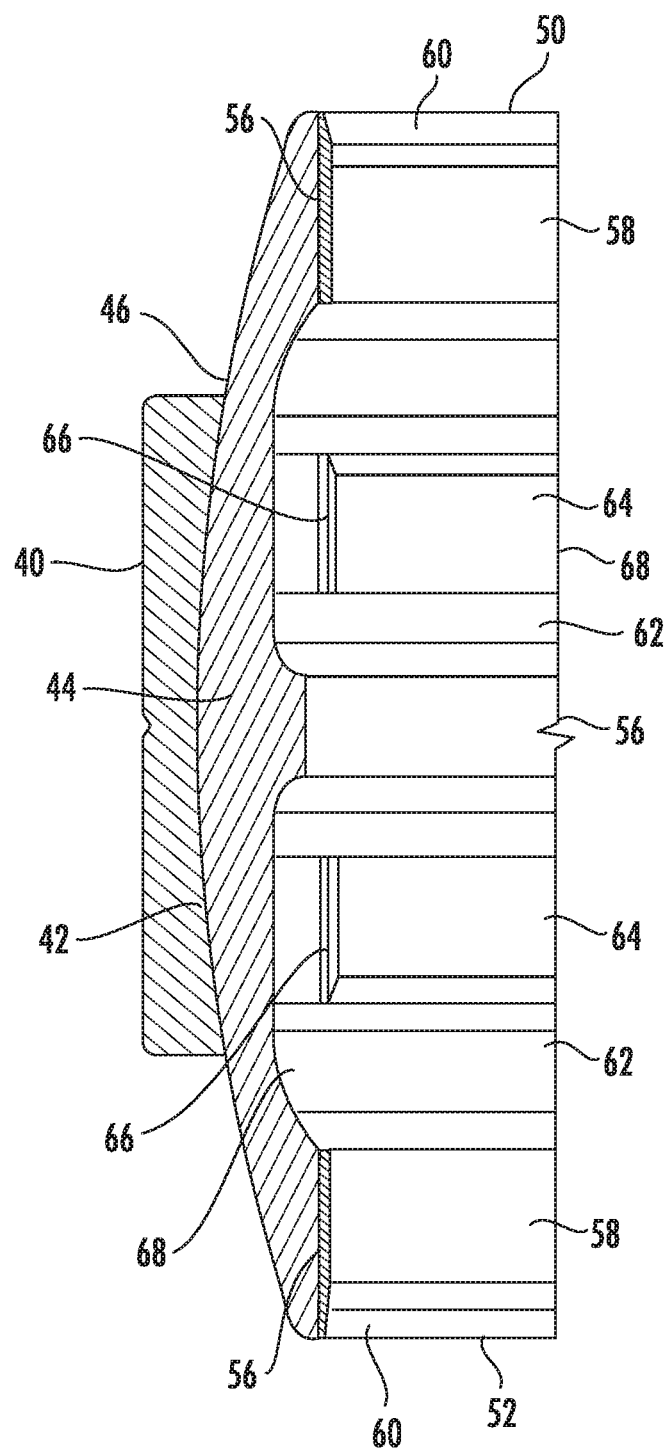
FIG. 4 is a perspective section view of the spherical bearing of FIG. 4 according to an embodiment.

Referring now to FIGS. 3 and 4, an example of a uniball or spherical bearing 34 configured for use with the swashplates 22, 24 is illustrated in more detail. The uniball or spherical bearing 34 includes an outer race or housing 40 having an inner surface 42 configured to accommodate a concave spherical surface. In an embodiment, a wear liner or coating (not shown) may be disposed over the inner surface 42 of the outer race 40 to minimize wear and increase the operational life of the bearing 34. A generally spherical ball 44 is positioned within the opening defined by the outer member 40. The outer surface 46 of the spherical ball 44 is complementary to and dimensioned to contact the inner diameter 42 of the outer race 40. As a result, the inner surface 42 of the outer member 40 engages the outer surface 46 of the spherical ball 44. This interface between the spherical ball 44 and the outer member 40 serves as the spherical joint and accommodates spherical rotation or pivoting of the spherical bearing 34 with respect to the cylindrical guide 35.

The spherical ball 44 may be formed from a metallic material and has a generally cylindrical opening 48 extending from a first end 50 to a second opposite end 52 thereof. The opening 48 defines a translational wear surface of the spherical ball 44 arranged in sliding contact with a cylindrical guide 35 positioned within the opening 48. In the illustrated, non-limiting embodiment, the portion of the spherical ball 44 configured to contact the cylindrical guide 35 is not a continuous surface extending between the first end 50 and the second end 52 of the inner member 44. Rather, the spherical ball 44 includes a plurality of contact surfaces 56 spaced at intervals between the first end 50 and the second end 52 of the inner member 44.

In an embodiment, at least one pad or liner 58 is bonded, such as in an overlapping arrangement for example, to one or more of the contact surfaces 56 of the spherical ball 44. For example, as shown in FIGS. 3 and 4, the liner 58 is positioned over the contact surfaces 56 closest to the first end 50 and the second end 52 of the spherical ball 44. Embodiments where a liner 58 is positioned over one of the intermediary contact surfaces 56 are also contemplated herein. In an embodiment, the liner 58 is formed from a resilient material, such as polytetraflourothelyne or other comparable materials for example. The pieces of liner 58 positioned over the contact surfaces 56 closest to the first end 50 and the second end 52 of the spherical ball 44 may include a tapered outer edge 60 configured to facilitate centering of the cylindrical guide 35 within cylindrical opening 48.

One or more recessed areas 62 are formed in the inner member 44 between adjacent contact surfaces 56. As shown in FIG. 4, the recessed areas 62 are offset from the plane defined by the contact surfaces 56 configured to contact cylindrical guide 35. Positioned within at least one of the recessed areas 62 is another liner 64. The height of the liner 64, measured between the first end 50 and the second end 52 of the inner member 44, is generally less than the overall height of the recessed area 62. In an embodiment, the liner 64 includes a Teflon wear surface supported on a fiberglass material. A compressible member 66, such as formed from an elastomeric or other spring-like material for example, may be positioned between the recessed area 62, and the liner 64. When the compressible member 66 is in an uncompressed state, the exposed surface 68 of the liner 64 may extend beyond the plane defined by the liner 58. As a result, the liner 64 is biased by the compressible member 66 into contact with a linear wear surface of the cylindrical guide 35 disposed within the opening 48.

The uniball or spherical bearing 34 illustrated and described herein provides a means for controlling the fit between the bearing inner member 44 and the surface of the shaft, while also accommodating deformation of the running surface. Deformation, as used herein may be a result of applied loads and/or thermal growth (i.e. radial expansion and contraction) of the running surface. This adaptability of the spherical bearing 34 may eliminate the need for traditional swashplate guides and the corresponding hardware, resulting in a more weight efficient design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A spherical bearing which extends from and connects to a deformable component comprising:
    an outer member; and
    an inner member pivotable relative to the outer member about an axis, the inner member having an opening formed therein that defines a plurality of coplanar contact surfaces shaped to accommodate and contact the component, wherein the plurality of contact surfaces are movable to accommodate the deformation of the component positioned within the opening, wherein a wear liner is disposed on an inner surface of the outer member between the outer member and the inner member.

2. The spherical bearing according to claim 1, wherein the inner member comprises an elastomeric material.

3. The spherical bearing according to claim 1, wherein the outer member has a generally concave surface and the inner member has a generally convex surface.

4. The spherical bearing according to claim 1, wherein the inner member includes at least one recessed area arranged between adjacent contact surfaces.

5. The spherical bearing according to claim 1, wherein the wear liner comprises a first liner, and the spherical bearing further comprises a second liner bonded to at least one of the plurality of contact surfaces of the inner member.

6. The spherical bearing according to claim 5, wherein the second liner comprises a resilient material.

7. The spherical bearing according to claim 5, wherein the second liner comprises a Teflon wear surface.

8. The spherical bearing according to claim 5, further comprising a compressible member positioned within a recessed area between the inner member and the second liner.

9. The spherical bearing according to claim 8, wherein the compressible member biases the second liner into contact with a wear surface of the component towards the opening.

10. A rotor system comprising:
    a rotationally stationary swashplate pivotally mounted about a central pivot point defined along an axis of rotation via a spherical bearing;
    a rotational swashplate which defines a rotor pitch control point, said rotor pitch control point defined along an in-line plane which passes through said central pivot point; and
    a bearing system mounted between said rotationally stationary swashplate and said rotational swashplate, said bearing system having the spherical bearing for receiving a deformable component, the spherical bearing including:
        an outer member; and
        an inner member complementary to the outer member such that the inner member is pivotable relative to the outer member about an axis, an outer surface of the inner member being complementary to and dimensioned to contact an inner diameter of the outer member, the inner member having an opening formed therein that defines a plurality of coplanar contact surfaces shaped to accommodate and contact the component, the plurality of contact surfaces being spaced at intervals between a first end of the inner member and a second end of the inner member, wherein the plurality of contact surfaces are movable to accommodate deformation of the component.

11. The rotor system according to claim 10, wherein the outer member has a generally concave surface and the inner member has a generally convex surface.

12. The rotor system according to claim 10, wherein the inner member comprises an elastomeric material.

13. The rotor system according to claim 10, wherein a wear liner is disposed on an inner surface of the outer member between the outer member and the inner member.

14. The rotor system according to claim 10, further comprising a liner bonded to at least one of the plurality of contact surfaces of the inner member.

15. The rotor system according to claim 14, wherein the liner comprises a resilient material.

16. The rotor system according to claim 14, further comprising a compressible member positioned within the recessed area between the inner member and the liner.

17. The rotor system according to claim 16, wherein the compressible member biases the liner into contact with a wear surface of the component towards the opening.

18. The rotor system according to claim 10, wherein the rotor system is a portion of an aircraft.

\* \* \* \* \*